(12) United States Patent
Polinsky et al.

(10) Patent No.: US 6,782,153 B2
(45) Date of Patent: Aug. 24, 2004

(54) HYBRID OPTO-MECHANICAL COMPONENT

(75) Inventors: David Polinsky, San Francisco, CA (US); Benedict J. Costello, Berkeley, CA (US)

(73) Assignee: DiCon Fiberoptics, Inc., Richmond, CA (US)

( * ) Notice: Subject to any disclaimer, the term of this patent is extended or adjusted under 35 U.S.C. 154(b) by 92 days.

(21) Appl. No.: 09/941,411

(22) Filed: Aug. 28, 2001

(65) Prior Publication Data

US 2004/0114246 A1 Jun. 17, 2004

(51) Int. Cl.[7] .................................................. G02B 6/26
(52) U.S. Cl. ............................ 385/16; 385/18; 385/24; 385/33; 398/43; 398/68
(58) Field of Search ............................... 385/15–18, 31, 385/33, 24; 398/43, 48, 68, 79, 88, 111

(56) References Cited

U.S. PATENT DOCUMENTS

| | | | |
|---|---|---|---|
| 4,317,611 A | | 3/1982 | Petersen |
| 4,498,730 A | * | 2/1985 | Tanaka et al. ................ 385/18 |
| 5,024,500 A | | 6/1991 | Stanley et al. |
| 5,629,790 A | | 5/1997 | Neukermans et al. |
| 5,914,801 A | | 6/1999 | Dhuler et al. |
| 5,943,454 A | * | 8/1999 | Aksyuk et al. ............... 385/22 |
| 5,969,848 A | | 10/1999 | Lee et al. |
| 5,974,207 A | | 10/1999 | Aksyuk et al. |
| 6,025,951 A | | 2/2000 | Swart et al. |
| 6,031,946 A | | 2/2000 | Bergmann et al. |
| 6,097,860 A | | 8/2000 | Laor |

OTHER PUBLICATIONS

"Integrated Polysilicon and DRIE Bulk Silicon Micromachining for an Electrostatic Torsional Actuator," Jer–Liang Andrew Yeh et al., *Journal of Microelectromechanical Systems*, vol. 8, No. 4, Dec. 1999, pp. 456–465.
"A Flat High–Frequency Scanning Micromirror," Robert A. Conant et al., Solid–State Sensor and Actuator Workshop, Hilton Head Island, South Carolina, Jun. 4–8, 2000, pp. 6–9.
"Wavelength Add–Drop Switching Using Tilting Micromirrors," Joseph E. Ford et al., *Journal of Lightwave Technology*, vol. 17, No. 5, May 1999, pp. 904–910.

* cited by examiner

*Primary Examiner*—Drew A. Dunn
*Assistant Examiner*—Fayez Assaf
(74) *Attorney, Agent, or Firm*—Parsons Hsue & de Runtz LLP

(57) ABSTRACT

The optical hybrid device includes input optical fiber(s), output optical fiber(s), a lens, a broadband or passband filter, a movable mirror, and an actuator operative to move the mirror or the filter. Depending on a voltage applied to the actuator, the actuator selectively sets the mirror or filter to each of a plurality of positions, so that selected portion(s) of radiation from one or more input beams carried by the input optical fiber(s) are conveyed to the output optical fiber(s); whereby the device performs two or more of the functions of wavelength division multiplexing or demultiplexing, attenuation, switching, filtering and tapping functions.

22 Claims, 9 Drawing Sheets

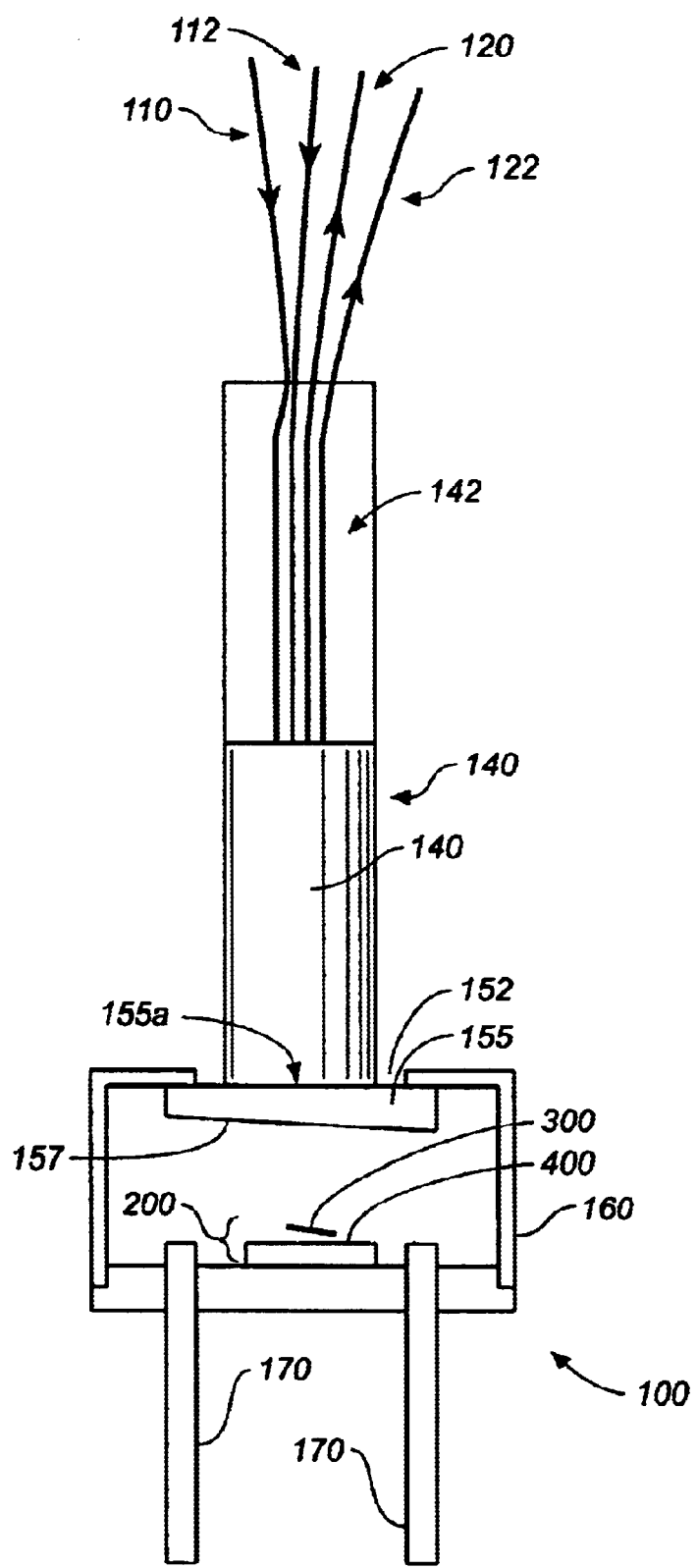
FIG._1A

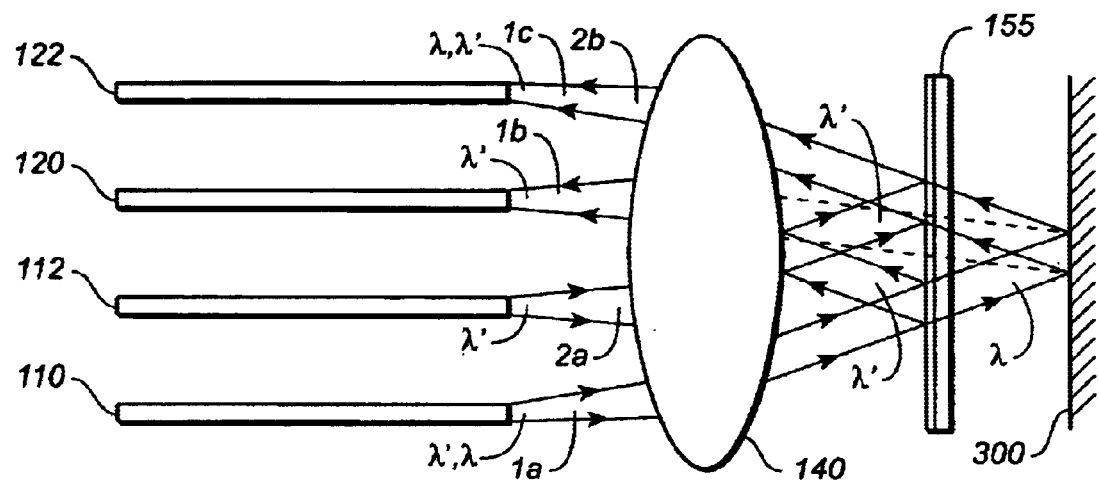
FIG._1B
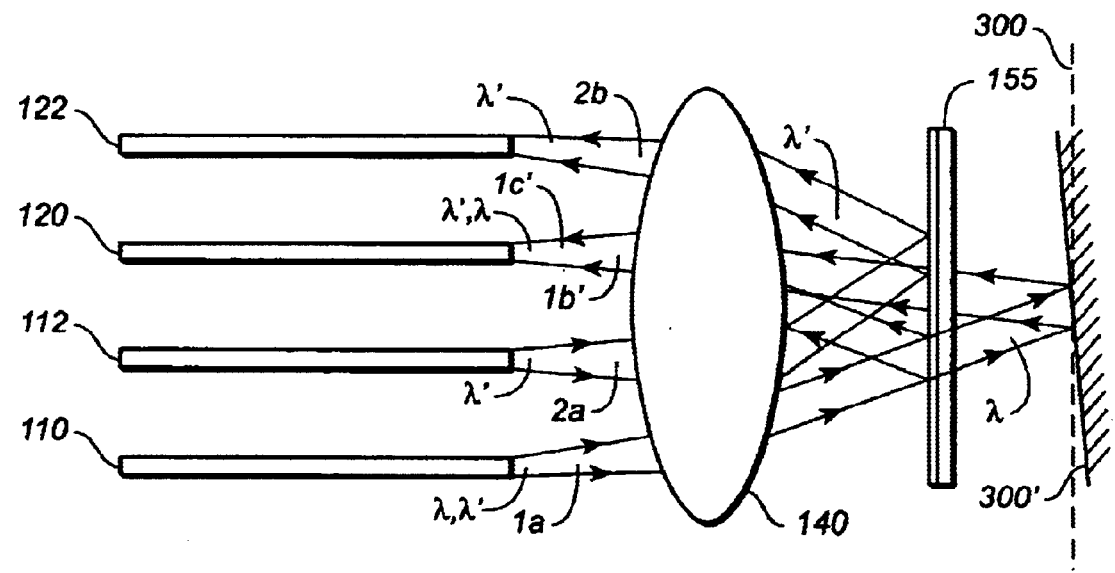
FIG._1C

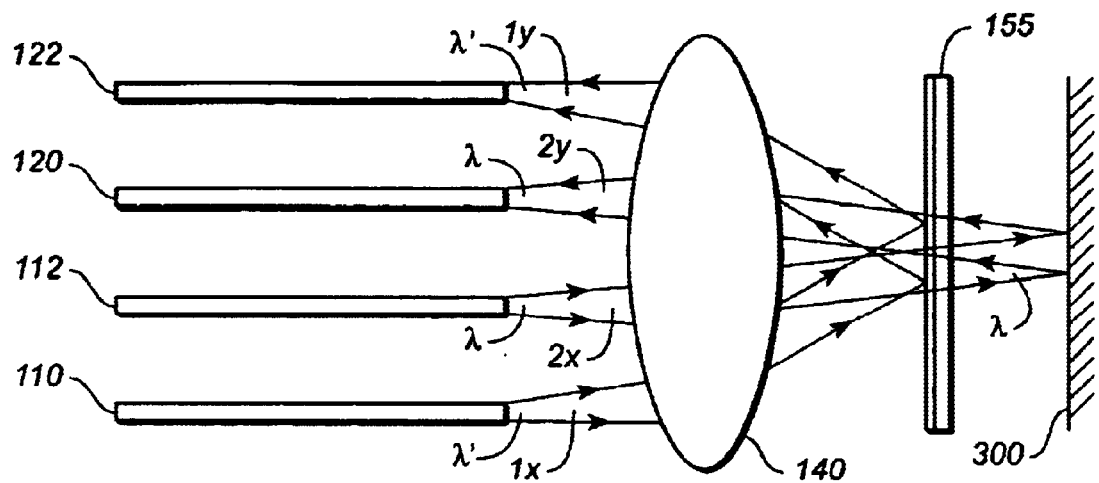
FIG._1D
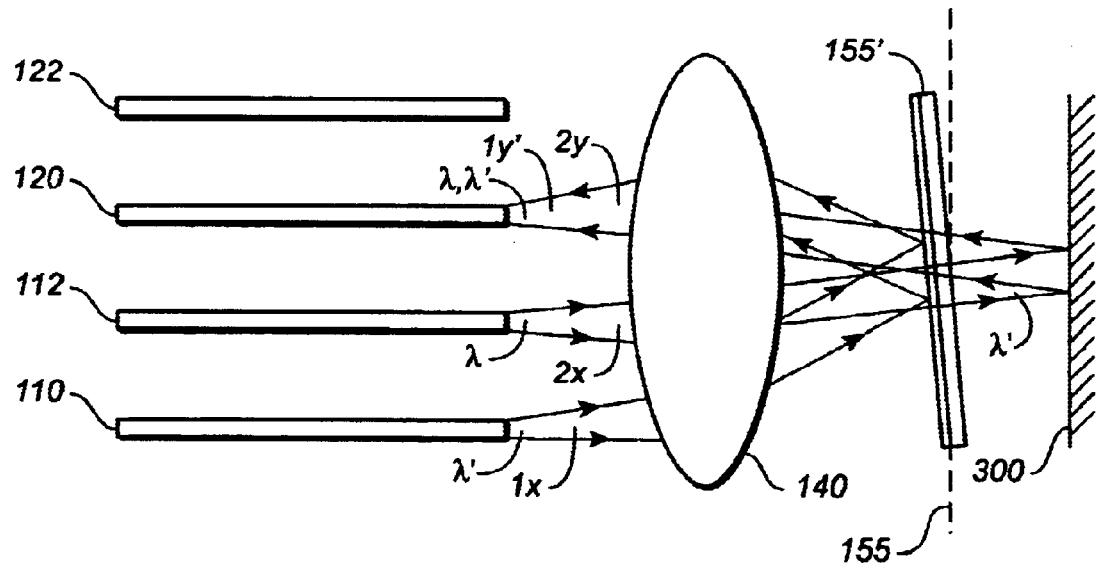
FIG._1E

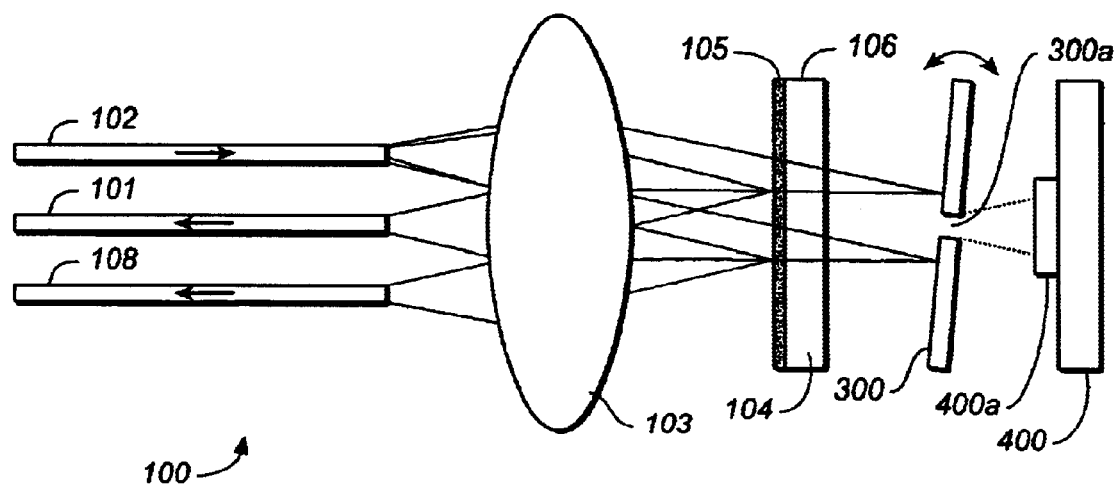
FIG._1F
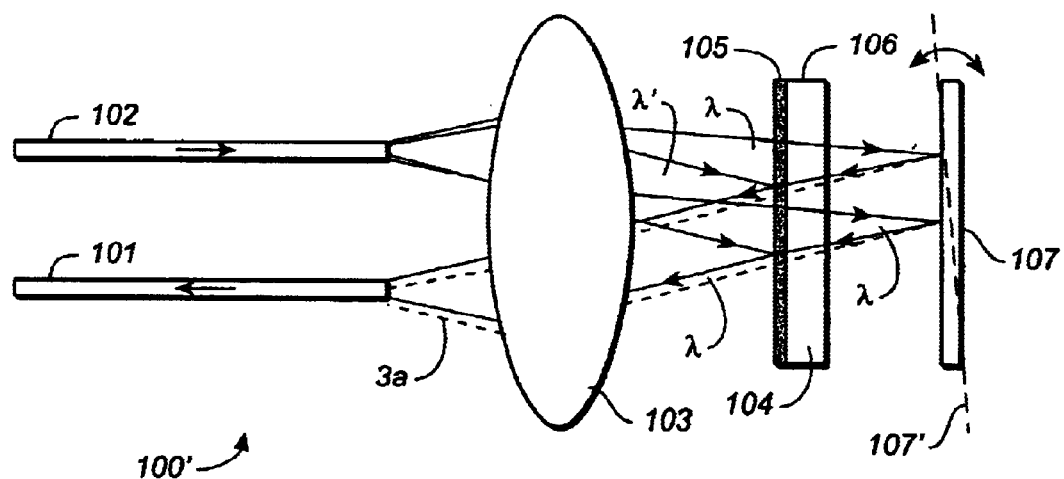
FIG._2

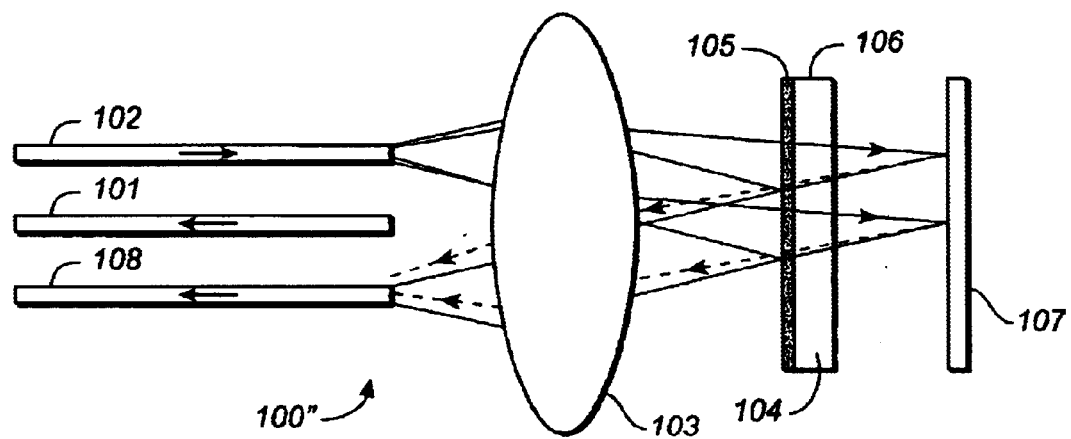
FIG._3
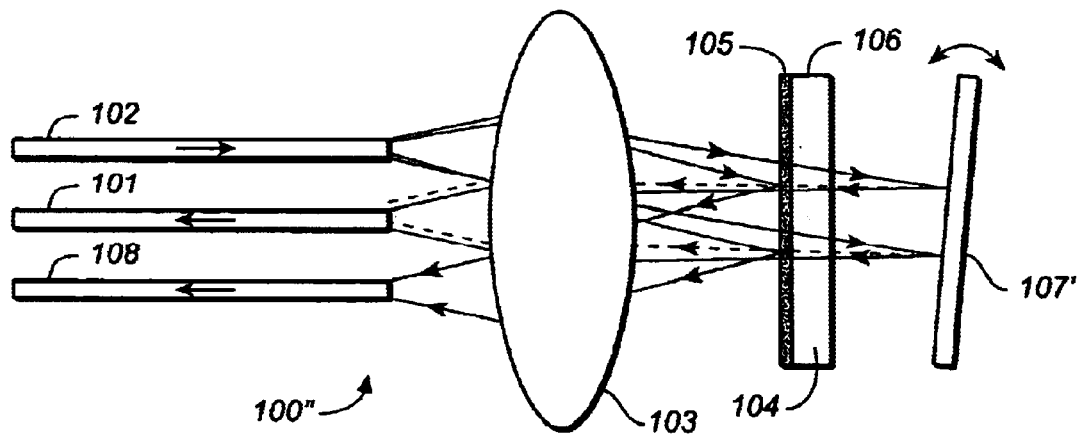
FIG._4

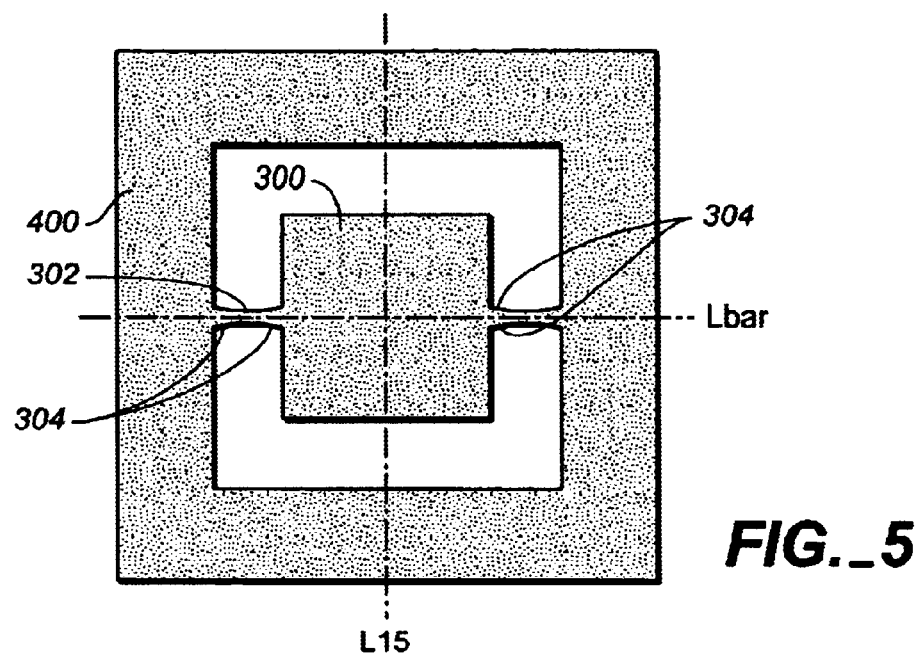
FIG._5
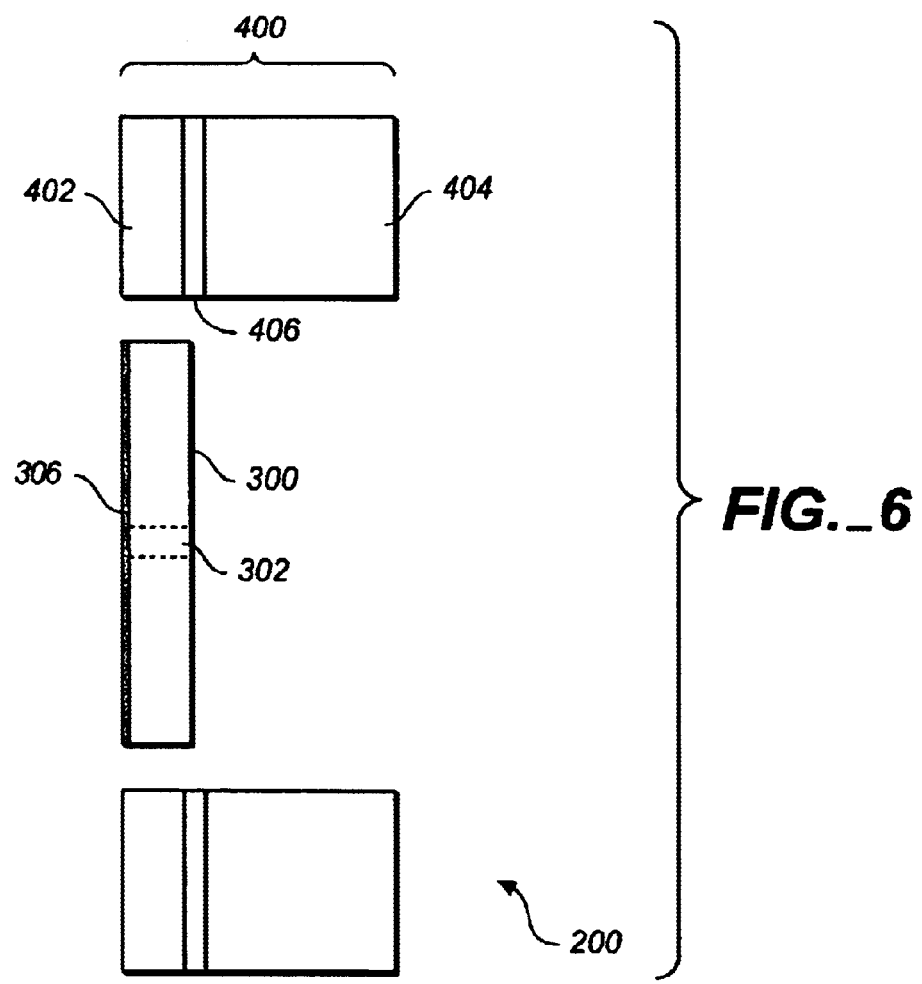
FIG._6

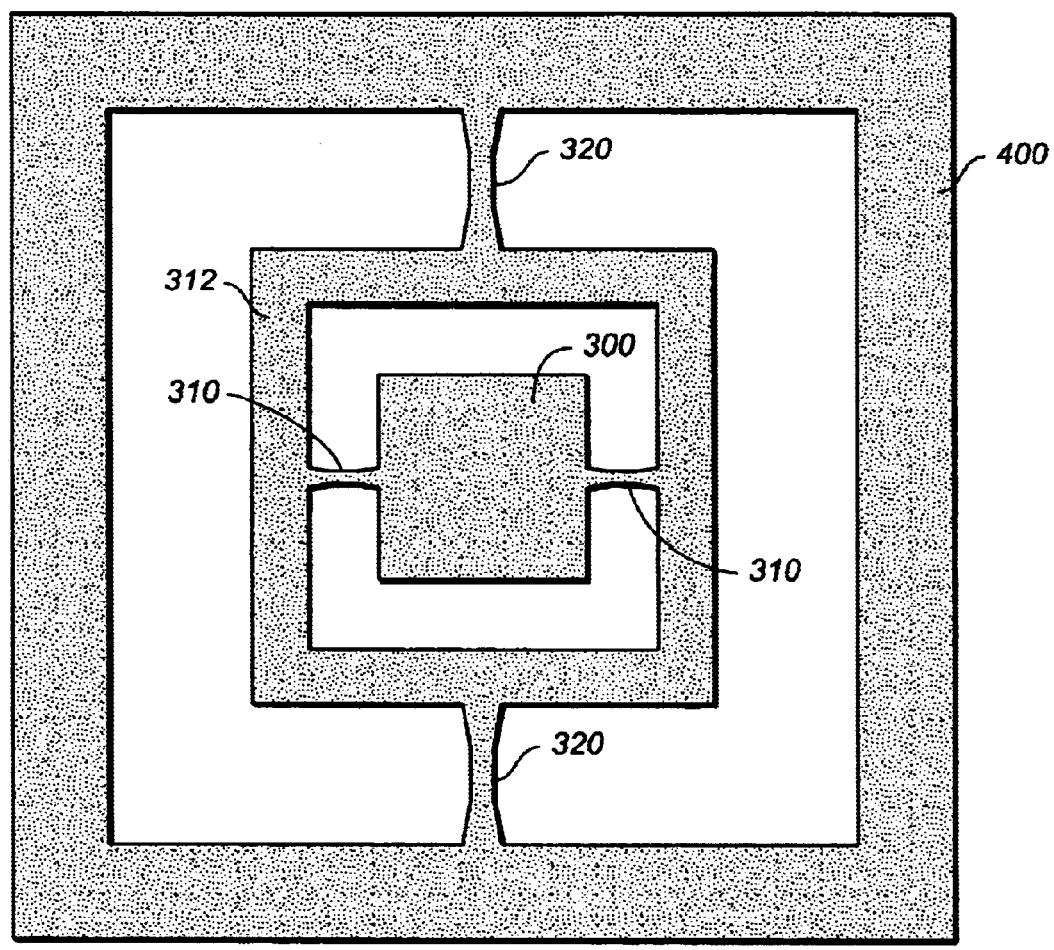
FIG._7

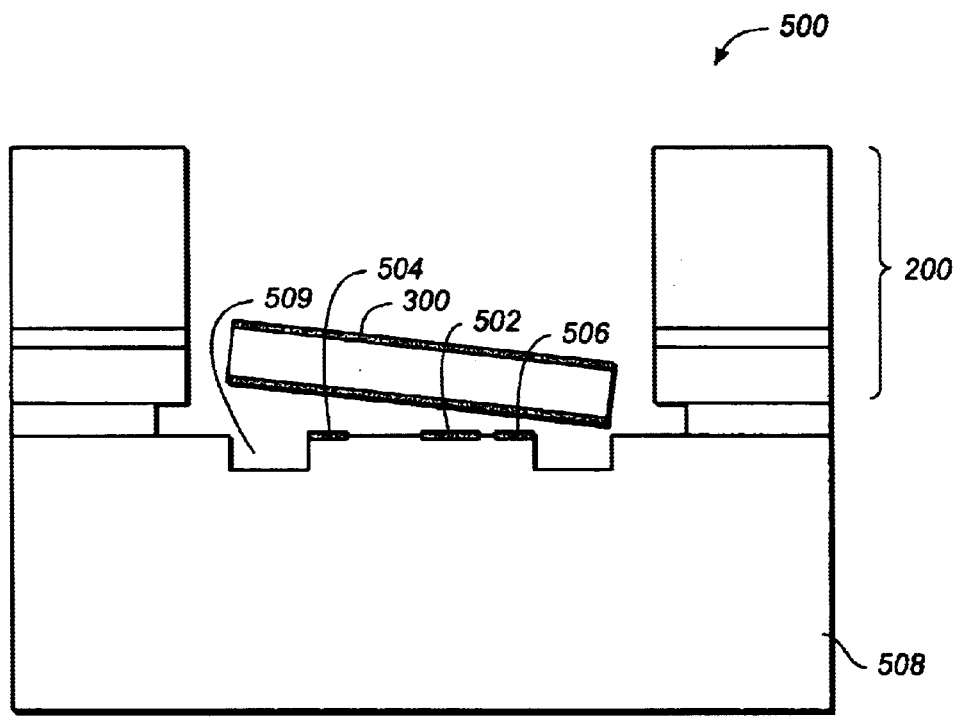
FIG._8
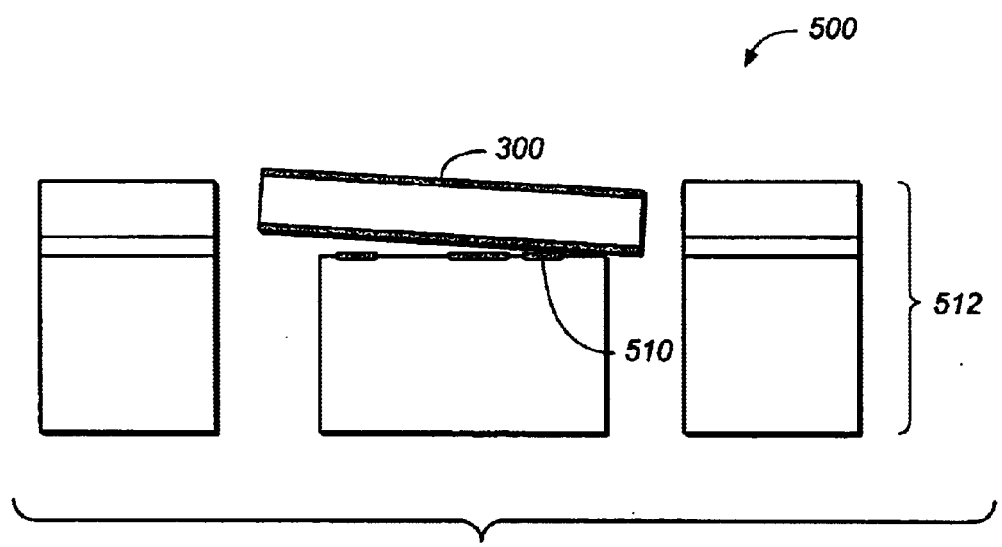
FIG._9

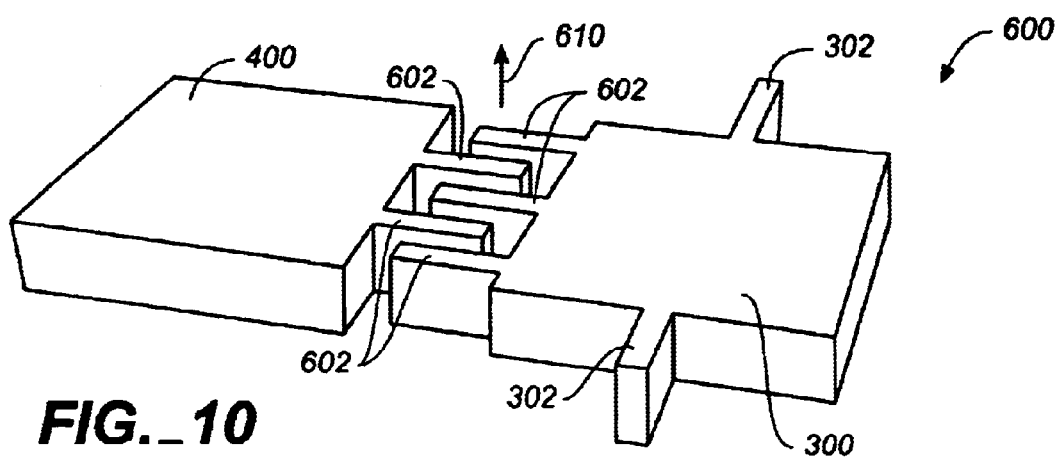
FIG._10
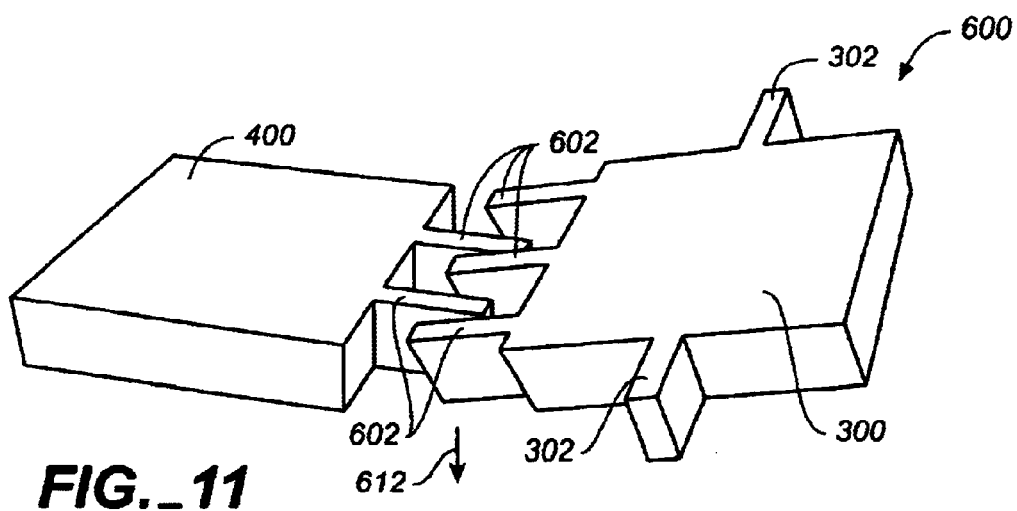
FIG._11
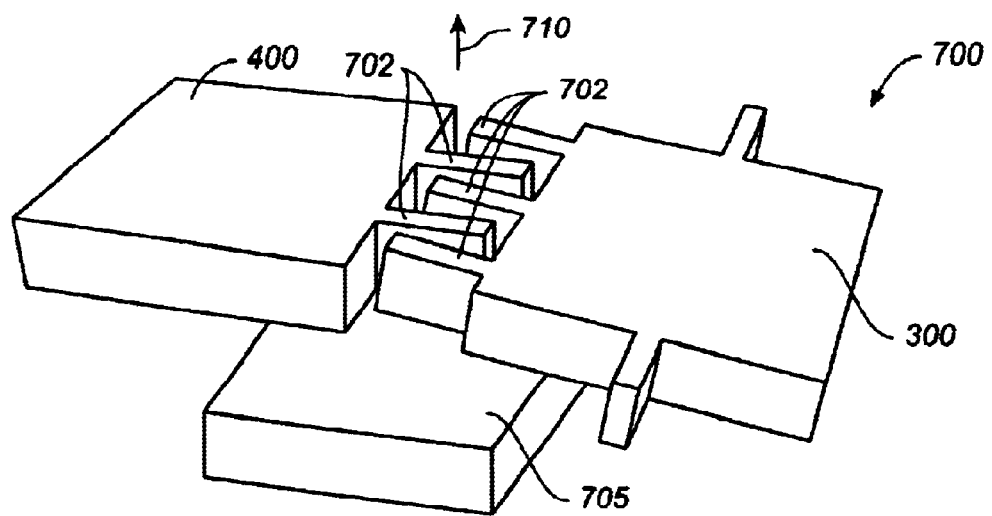
FIG._12

US 6,782,153 B2

HYBRID OPTO-MECHANICAL COMPONENT

BACKGROUND OF THE INVENTION

This invention relates in general to hybrid optical devices, and specifically, to a hybrid optical device which includes a filter and a reflective surface in an optical path between at least one input and at least one output.

Optical communications systems are built by combining sub-systems or modules which perform specific networking functions such as removing a single wavelength or group of wavelengths from the complete set of wavelengths (called Add/Drop Multiplexers) or equalizing the optical power level at all the wavelengths (called Dynamic Power Equalizers). A general description of these applications can be found in "Introduction to DWDM Technology" by Stamatios Kartalopoulos, Wiley-Interscience, 2000. Traditionally such sub-systems or modules are manufactured by integrating several discrete optical components, each of which performs one function, on a printed circuit board or within an enclosure. The large number of such single-function components in each module or sub-system increase the cost, size and optical power loss of these network elements.

There is therefore a need to provide hybrid optical devices in which two or more functions are combined within the same component.

SUMMARY OF THE INVENTION

Hybrid passive components are optical components which combine more than one optical function within the same package without converting the optical signal back into its electrical form and without coupling the light multiple times into and out of the fiber. In so doing, they have the potential to reduce the assembly cost, size and optical power loss of network elements. Generally they use some type of free space optical mounting system to insert multiple optical elements between a single set of input and output fibers.

Within Optical Add/Drop Multiplexers and Dynamic Power Equalizers, for example, Applicants recognized that there is a strong need for components which combine the dynamic control of optical power levels by means of a variable optical attenuator, with other functions such as switching, tapping and wavelength division multiplexing. In this way, only a portion of the optical signals will have their power level dynamically adjusted. Applicants recognized that in Switchable Optical Add/Drop Multiplexers and other types of Multiplexers, it is desirable to combine functions using hybrid components that are able to combine two or more of wavelength division multiplexing (WDM) or demultiplexing, attenuation, switching, filtering, tapping and other functions.

A hybrid optical device particularly useful for the above-mentioned applications comprises a filter and a reflective surface, both placed in an optical path between a first set of one or more input optical channels and a second set of one or more output optical channels. The filter passes some of the radiation of the input beam(s) from selected channel(s) of the first set and reflects the remainder. The reflective surface reflects at least some of the radiation that is passed by the filter. The reflective surface or the filter is moved to each of a plurality of positions to perform two or more functions, such as wavelength division multiplexing or demultiplexing, attenuation, switching, filtering, tapping, as well as other functions. Preferably, the optical components of the hybrid device are such that the passage of radiation through the device is non-directional (or bi-directional), so that input channels can become output channels, and output channels can become input channels, whether or not the number of input and output channels are equal.

Preferably, the filter or the reflective surface is moved to the positions by means of an actuator. In the preferred embodiment, the reflective surface and the actuator are provided on a silicon wafer and the actuator includes a plurality of interdigitated fingers. Also preferably, the reflective surface, the filter and the actuator are enclosed by means of a package.

BRIEF DESCRIPTION OF THE DRAWINGS

FIG. 1A is a cross-sectional view of one embodiment of the optical hybrid device according to the present invention.

FIGS. 1B and 1C are schematic cross-section views of an arrangement of some of the components of the optical hybrid device of FIG. 1A where a reflective surface of the device is moved to arrive at two different states according to the present invention.

FIGS. 1D and 1E are schematic cross-section views of an arrangement of some of the components of the optical hybrid device of FIG. 1A where a filter of the device is moved to arrive at two different states according to the present invention.

FIG. 1F is a cross-sectional view of another embodiment which is similar to the embodiment of FIGS. 1A–1E, except that only one input fiber is employed, and that a photodetector is employed to detect radiation that passes the reflective surface.

FIG. 2 is a cross-sectional view of another embodiment of the optical hybrid device according to the present invention.

FIGS. 3 and 4 are schematic diagrams of a first state and a second state of the optical hybrid device according to one embodiment of the present invention.

FIG. 5 is a plan view of the structure of the mirror chip according to the present invention.

FIG. 6 is a cross-sectional view of the structure of the mirror chip cut along by the line L15 in FIG. 5.

FIG. 7 is an alternate suspension mechanism of the mirror according to the present invention.

FIGS. 8 and 9 are cross-sectional views of the structure of the actuator for the mirror according to the present invention.

FIGS. 10 and 11 are diagrams showing the structure of a vertical comb drive actuator according to the present invention.

FIG. 12 is a diagram showing the structure of a levitation force comb actuator according to the present invention.

DETAILED DESCRIPTION OF THE PREFFERED EMBODIMENTS

The present invention will now be described in detail with reference to the drawings, wherein like elements are referred to with like reference labels throughout.

The optical hybrid according to the present invention employs a reflective surface which preferably includes a microfabricated mirror to direct light or other forms of electromagnetic radiation (referred to collectively below as "light") from one or more input optical fibers to one or more output optical fibers. When the present invention functions as an optical switch, the mirror is tilted by an electronic control signal to redirect the light beam to alternate output fibers. When the present invention functions as an optical attenuator, the mirror is tilted to redirect the light beam gradually away from an output fiber, thus attenuating the output signal power. Similar functions can be achieved by tilting a narrow band pass, broad band pass or tap filter element in the device.

The optical switch/WDM hybrid and the optical attenuator/WDM hybrid embodiments preferably include a thin film filter element which reflects a portion of the incoming light from one or more input optical fibers to one or more output optical fibers. The remaining portion of the light from one or more input optical fibers is then transmitted through the filter onto a microfabricated mirror which is used to direct light either onto the same input fiber or onto an output fiber. The filter element may be a band pass or broad band filter element.

In the case where the actuator of the microfabricated mirror or filter is driven in such a way that all of the light is intended to be fully coupled into an output fiber, the optical component acts as a hybrid between a WDM and an optical switch.

In the case where the actuator of the of the microfabricated mirror or filter is driven in such a way that that the amount of light which is directed onto the output fiber can be continuously adjusted, the optical components acts as a hybrid between a WDM and an optical attenuator.

FIG. 1A illustrates a cross-section view of a first embodiment of an optical switch/WDM hybrid or an optical attenuator/WDM hybrid 100 as described below. The optical switch/WDM or attenuator/WDM 100 includes input optical fiber 110 and 112, output optical fibers 120 and 122, a lens 140, a thin film filter element 155 and a mirror 300. The input optical fibers 110 and 112 send one or more light beams from an external device coupled to the switch/WDM or attenuator/WDM. The light is coupled through the lens and a portion of the light will be reflected from the thin film filter onto the output fibers 120 and 122. The portion of the light which is not reflected by the thin film filter will be transmitted through the filter and impinge on the surface of the mirror. Depending on the position of the mirror the impinging light will be fully or partially directed back onto the input fiber or onto one input fiber or one output fiber.

A ferrule 142 supports the, input optical fibers 110 and 112 and the output fibers 120 and 122 relative to one another, and relative to lens 140. The ferrule is made of glass or ceramic. The ferrule 142 supports the input optical fibers 110 and 112, and the output optical fiber 120 and 122 in a predetermined pattern described below referring to FIGS. 1B–1E below.

The mirror 300 is manufactured preferably on a part of a substrate 400, and is movably supported on the substrate 400. The substrate 400 is preferably made of silicon. A mirror chip 200 includes the mirror 300, the substrate 400, and an actuator, which is not shown in FIG. 1A, but which will be described in detail referring to FIGS. 5–12, for moving the mirror 300 in response to a control signal applied to electrical leads 170.

A package 160 encases the mirror chip 200 in order to prevent dirt, moisture or corrosion from impairing its operation. The package 160 has an opening 152 through which the light beam passes. This opening can be sealed in order to prevent dirt or moisture from impairing the operation of the mirror either using the thin film filter 155, the outer diameter of the lens 140, or a glass window which is not shown in FIG 1A.

The thin film filter element 155 is made of a transparent material, such as glass. The thin film filter element 155 can be coated on both sides. The filter element 155 preferably has an anti-reflective coating 157 on the side facing the mirror chip 200. The side 155a of the filter element 155 can either be coated with a narrow bandpass filter, which transmits the light in a certain portion of the wavelength spectrum, and reflects the remaining portion of the light outside this narrow band spectrum or it can be a broadband tap which transmits a portion of the power with the same percentage at all wavelengths and reflects the remaining portion. The filter element 155 preferably has a wedged cross-section, as shown in FIG. 1A in order to prevent an etalon caused by the two faces of the filter element 155. The package 160 is preferably a TO-type package, which is a cylindrical metal can with the parallel leads 170 extending from the bottom surface of the package 160.

One end of the lens 140 is attached to the ends of the co-terminus input and output optical fibers 110, 112, 120 and 122. Another end of the lens 140 is attached to the coated surface 155a of the filter element 155. The lens will be flush with the inside wall of the package 160, if the filter element 155 is used to seal the package 160. Or it may be inserted into the package 160 in which case the package 160 will be sealed to the outer wall of the lens 140.

The light beam travels in one or more of the input optical fibers 110 and 112, and is collimated by the lens 140. A portion of the optical signal is reflected off of the reflective optical coating 155a, is focused back through the lens 140 and is coupled to one of the output fibers 120 and 122. The remaining portion of the optical signal is transmitted through the filter element 155 and reflects off the mirror 300. The light which reflects off the mirror is transmitted through the filter element 155 and focused by the lens 140 onto one of the output fibers 120 and 122. If the mirror 300 is moved by the actuator in such a way that all of the light which reflects off the mirror 300 is coupled onto one of the output fibers 120 and 122, where the chosen output fiber depends on the drive voltage to the electrical leads 170, then the component acts as a hybrid between a WDM and an optical switch. If the mirror 300 is moved by the actuator in such a way that either all or a portion of the light which reflects off the mirror 300 is coupled onto just one of the output fibers 120 and 122, where the amount of light which is coupled is continuously adjustable depending on the drive voltage to the electrical leads 170, then the component acts as a hybrid between a WDM and a optical attenuator.

The lens 140 is preferably a GRIN (gradient index lens), and is sandwiched by the ferrule 142, and the coating 155a of the filter element 155.

The arrangement of the embodiment illustrated in FIG. 1A forms a compact assembly that is stable to variations due to changes in the ambient conditions, such as temperature, humidity, and mechanical stress or vibration. Thus, according to the present invention, a reliable and compact switch/WDM or attenuator/WDM hybrid is realized.

In another embodiment, the mirror 300 may be partially transmissive, in which case a portion of the light which impinges on the surface of the mirror is reflected back onto one of the output fibers and the remaining portion is transmitted through the mirror. (The partially transmissive character of the mirror could be the result of one or more holes being placed in the mirror or it could be the result of using a thin film coating on the mirror surface.) In this embodiment the substrate 400 is a photodiode or has a photodiode mounted to it as described below which converts the incident optical signal back to an electrical signal. By this method it is possible to tap a portion of the incoming signal for the purposes of monitoring the power level in one or more channels as well as analyzing the optical signal data.

FIGS. 1B and 1C are schematic cross-section views of an arrangement of some of the components of the optical hybrid device of FIG. 1A where a reflective surface of the device is moved to arrive at two different states according to the present invention.

As shown in FIG. 1B, the input light beam 1a from input optical fiber 110 is collimated by lens 140 and impinges on filter 155 which is a bandpass filter. In FIGS. 1B–1E and FIG. 2, the wavelength components having wavelengths within the pass band of the filter 155 or 105 are indicated by λ, and the wavelength components having wavelengths outside the pass band of the filter are indicated by λ'. The wavelength component(s) in beam 1*a* that are not within the passband of filter 155 are therefore reflected. The reflected beam is focused by lens 140 as beam 1*b* to output fiber 120. The wavelength component(s) in input beam 1*a* carried by fiber 110 within the passband of filter 155 pass the filter to reach a reflective surface such as mirror 300, whereupon the beam is reflected again through filter 155 and focused by lens 140 as beam 1*c* to output fiber 122.

Input beam 2*a* carried by input fiber 112 is collimated by lens 140 and directed to filter 155. The wavelength components of beam 2*a* are outside the passband of filter 155, so that they are reflected by the filter and focused by lens 140 to output fiber 122 as output beam 2*b*. It will be seen that output beams 2*b*, 1*c* are both focused by lens 140 to optical fiber 122. Thus, as will be seen from FIG. 1B, all of the wavelengths components in beam 2*a* carried by input fiber 112 are reflected and focused to output fiber 122. On the other hand, the input beam 1*a* is separated into two parts: the wavelength components that are within the passband of filter 155 are reflected by surface 300 as output beam 1*c* to fiber 122, and the wavelength components of beam 1*a* outside of the passband of filter 155 are reflected by the filter and focused to output fiber 120.

If the reflective surface 300 is rotated to position 300' which is tilted at an angle to the previous position 300 of the surface as shown in FIG. 1C, however, the wavelength components of input beam 1*a* that are reflected by surface 300' are now instead focused by lens 140 as output beam 1*c*' to output fiber 120 instead of fiber 122 as shown in FIG. 1C.

From the above, it will be evident that FIGS. 1B, 1C illustrate two different states of the components of the hybrid optical device 100 of FIG. 1A in performing wavelength division multiplexing as well as switching functions.

Instead of moving reflective surface 300, the above-described WDM and switching functions may also be accomplished by moving filter 155 instead as illustrated in FIGS. 1D, 1E. As shown in FIG. 1D, input beam 1*x* carried by input fiber 110 is collimated by lens 140 towards filter 155. The wavelength components of beam 1*x* are outside the passband of filter 155 so that they are reflected by the filter and focused by lens 140 to output fiber 122 as beam 1*y*. Input beam 2*x* carried by input fiber 112 is collimated by lens 140 towards filter 155. The wavelength components of beam 2*x* are within the passband of filter 155 so that they pass through the filter and are reflected by reflective surface 300 back through the filter and focused by lens 140 as output beam 2*y* towards output fiber 120.

In order to perform WDM and switching functions so that the reflection of input beam 1*x* is conveyed to fiber 120 instead of fiber 122, the filter is rotated or otherwise moved to a tilted position 155' at an angle to its prior position 155 so that it reflects the collimated beam originating from input beam 1*x* along a different path towards lens 140 which focuses such beam as output beam 1*y*' towards output fiber 120. It will be noted that output beams 1*y*', 2*y* are both focused by lens 140 to the same optical fiber 120.

Among other differences, by moving the filter to position 155' as shown in FIG. 1E, the collimated beams originating from input beams 1*x*, 2*x* will impinge on the filter at a slightly different angle compared to the angle of impingement when the filter is not rotated at position 155. Such rotation may cause the passband of the filter to shift. However, if the tilt angle is small, the shift in the passband may be small enough to be ignored. Alternatively, such shifting of the passband of the filter may be advantageously used where desired for certain optical applications.

In another embodiment as shown in FIG. 1F, only one input fiber is employed. Input fiber 102 carries an input radiation beam, and fibers 101, 108 are output fibers, lens 103 serves the same function as lens 140 of FIG. 1A, and filter element 106, having a coating 105, serves the same function as filter 155. The mirror 300 may be partially transmissive, in which case a portion of the light which impinges on the surface of the mirror is reflected back onto one of the output fibers and the remaining portion is transmitted through the mirror. The partially transmissive character of the mirror could be the result of one or more holes 300*a* in the mirror or it could be the result of using a thin film coating (not shown) on the mirror surface. In this embodiment the substrate 400 is a photodiode or has a photodiode 400*a* mounted to it which converts the incident optical signal back to an electrical signal. By this method it is possible to tap a portion of the incoming signal for the purposes of monitoring the power level in one or more channels as well as analyzing the optical signal data.

FIG. 2 is an embodiment of the optical attenuator/WDM 100' according to the present invention in which there is one input fiber and one output fiber. In this embodiment, an input radiation consisting of a multitude of optical signals of different center wavelengths (sometimes also called "channels") which are coupled to the input fiber 102. These combined optical signals are then collimated by the lens 103 and image onto the thin film element 104. The optical coating 105 could be for example a narrow bandpass filter, which transmits a portion of the radiation spectrum containing a subset of the wavelength components in the optical signals and reflects all wavelength components outside of this narrow bandpass. The input fiber 102, output fiber 101 and collimating lens 103 are aligned in such a way that the wavelength components which are reflected off of the coated surface 105 are coupled back though the lens and into the output fiber 101 with minimal loss of optical power. The wavelength components which are transmitted by the narrow bandpass filter impinge on the mirror 107.

The mirror 107 is controlled by an actuator in such a way that it can reflect the light which hits it back through the filter element 104, then through the lens 103 and into the output fiber 101 with minimal loss of optical power. The actuator can also move the mirror 107 away from the position of lowest loss into a multiplicity of different positions which intentionally result in not all of the optical signal being coupled to the output fiber 101. One position 107' of such different positions of the mirror is shown in FIG. 2 in dotted line for achieving a selected amount of attenuation. The optical path 3*a* of the beam focused by lens 103 partially towards output fiber 101 is also shown in dotted lines where the mirror is at position 107'. Thus, at position 107', the mirror cause only a portion of the output beam 3*a* to be focused into output fiber 101, with the remainder of the beam focused to locations outside the fiber and is lost. By driving the actuator in this way, the attenuator/WDM acts as device which can cause a subset of the optical wavelengths entering the input fiber 102 to exit through the output fiber with a power level which can be dynamically adjusted, while all other wavelengths are transmitted through the device with a fixed amount of loss of optical power.

FIG. 3 is an embodiment of the optical attenuator/WDM 100" according to the present invention in which there is one input fiber and two output fibers. In this position 107 of the mirror, the optical signals which are reflected off the surface of the mirror are coupled into the same output fiber 108 as those which are reflected off the surface of the thin film filter.

FIG. 4 is an embodiment of the optical attenuator/WDM 100" according to the present invention in which there is one input fiber and two output fibers. In this position 107' of the mirror, the optical signals which are reflected off the surface of the mirror are coupled into a second output fiber 101 while those which are reflected off the thin film filter are reflected into a first output fiber 108.

FIGS. 3 and 4 are an embodiment of the present invention comprising a hybrid between a 1×2 switch and a WDM with one input fiber and two output fibers. This embodiment differs from the embodiment of FIG. 2 in that the mirror can be used to direct the wavelengths which are transmitted by the narrow bandpass filter 105 either back onto output fiber 108 (which contains the wavelengths reflected from the narrow bandpass coating) or, in another position 107' of the mirror the wavelengths which are transmitted by the narrow bandpass filter coating 105 can be directed to a second output fiber 101. In either position of the mirror, the coupling of the light from the mirror to the corresponding output fiber 101 or 108 is done with a minimum loss of optical power. In this way the device acts as a hybrid between a WDM and a 1×2 switch.

In another embodiment, which is a variation on the preceding embodiment, the mirror is moved by its actuator in such a way that the wavelengths which are transmitted by the narrow bandpass filter coating 105 can only be coupled to the output fiber 108. However the position of the mirror can be adjusted to a multiplicity of different positions which result in either minimal loss of optical power in the coupling to the output fiber 108 or which produces a finite significant loss of optical power. As in the embodiment of FIG. 2, one of the positions of the mirror and the optical path of the output beam caused by reflection of the mirror at such position is shown in dotted lines in FIG. 3. The same can be implemented for the embodiment of FIG. 4, where the position of the mirror and the resulting output beam reflected by the mirror are shown in dotted lines. In this way the device acts a hybrid between a WDM and an attenuator with two output ports.

In another embodiment which is similar to the preceding embodiments, the thin film filter coating 105 is a broadband reflector which transmits a portion of each of the wavelength components in the incoming radiation and reflects the remaining portion. The portion of the incoming radiation which is reflected from the thin film coating is coupled to output fiber 108 as illustrated in FIG. 3. The portion of the incoming radiation which is transmitted through the filter coating 105 is coupled to output fiber 108 with a power level which depends on the position of the mirror 107. One of the positions of the mirror and the optical path of the output beam caused by reflection of the mirror at such position are shown in dotted lines in FIG. 3. In this way the device acts as a hybrid between a tap and an attenuator.

In another embodiment which is a variation on one of the embodiments above, the wavelengths transmitted by the narrow bandpass filter 105, can be directed by the mirror to either output fiber 101 or output fiber 108. In this embodiment, the position of the mirror can be adjusted to a multiplicity of positions such that all of the optical power in the wavelengths which are transmitted by the narrow bandpass filter is coupled to an output fiber (either 101 or 108) or just some of the power in the transmitted wavelengths will be coupled. As in the embodiment of FIG. 2, one of the positions of the mirror and the optical path of the output beam caused by reflection of the mirror at such position are shown in dotted lines in FIG. 4. In this way the device acts as hybrid between a WDM and an attenuator/1×2 switch hybrid.

It will be noted that the optical systems in all of the figures of this application are nondirectional (or bi-directional), so that the optical paths through the systems in the figures can be reversed from those described above. In other words, instead of being input fibers, optical fibers 110, 112 and 102 may instead be output fibers instead. And output fibers 120, 122, 101 and 108 may become input fibers. In such event, the beams carried by fibers 120, 122, 101, 108 would become input beams, and the beams carried by fibers 110, 112 and 102 would become output beams instead. The directions of the optical beams would then be reversed from those shown in the figures. Such and other variations are within the scope of the invention.

The structure of the mirror chip 200 will be described in detail below. Although the mirror 300 can be fabricated from any number of materials, the mirror 300 is preferably manufactured from single crystal silicon since the mechanical and electrical properties of silicon are well known, and thus, there is a well-established technology for batch manufacturing silicon devices.

Now, referring to FIGS. 5–12, a structure of an actuator for moving the mirror 300 according to the present invention will be described in detail. FIG. 5 illustrates a plan view of the structure of the mirror chip 200 according to the present invention, and FIG. 6 illustrates a cross-sectional view of the structure of the mirror chip 200 cut along by the line L15 in FIG. 5. Supporting hinges 302 which movably support the mirror 300 functioning as a spring are fabricated on the substrate 400 by utilizing photolithography, and either wet chemical or plasma etching process. The thickness of the mirror 300 and hinges 302 is controlled by etching the silicon, or preferably, by using SOI (silicon-on-insulator) wafers.

Referring to FIG. 5, hinges 302 functioning as springs connect the mirror 300 to the substrate 400 from which the chip 200 was made. The hinges 302 are preferably made of the same silicon substrate 400 as the mirror 300. Typically, the hinges 302 are torsion bars that permit the mirror 300 to rotate about an axis Lbar of the torsion bars. The torsion bars are made significantly thicker than the width of the torsion bars so that the bars are more compliant in torsion than they are in other modes of bending. The hinges functioning as torsion bars can be stiffened in non-rotation modes of bending by adding fillets 304 at the two ends of each of the hinges 302.

Referring to FIG. 6, the substrate 400 preferably includes a silicon wafer, further preferably includes an SOI wafer, which includes silicon layers 402 and 404 separated by a silicon dioxide layer 406. The SOI wafers are manufactured or purchased with precisely controlled layer thickness. Moreover, available wet chemical and plasma etching techniques are preferably used to etch either silicon or silicon dioxide preferentially to the other material. Thus, the mirror 300 is fabricated with well-controlled thickness.

The mirror 300 is coated with a metal layer 306, such as gold, to increase its reflectivity. Alternatively, the reflectivity of the mirror 300 is improved by coating the mirror 300 with multiple layers of dielectric films.

FIG. 7 illustrates alternate suspension mechanisms of the mirror 300 according to the present invention. The suspension system of FIG. 7 is utilized in order to permit the mirror 300 to rotate in two degrees of freedom. One such mechanism is a gimbal mechanism whereby the mirror 300 is connected via torsion bars 310 to a frame 312 which is, in turn, connected to the rest of the substrate 400 by additional torsion bars 320 which are situated at an angle to the torsion bars 310. The angle between the torsion bars 310 and 320 is preferably about 90 degrees.

FIGS. 8 and 9 illustrate cross-sectional views of the structure of the actuator 500 for the mirror 300 according to the present invention. The mirror 300 is tilted between its rest position and one or more switched positions by applying an electric field between the mirror 300 and one or more driving electrode 502. The driving electrode 502 and the mirror 300 form a parallel plate electrostatic actuator. The driving electrode 502 is preferably metal traces on an electrode chip 508 fabricated from glass or silicon which is bonded to the mirror chip 200. Alternatively, driving electrodes 510 in FIG. 9 are fabricated from the same SOI wafer 512 which is used to make the mirror 300. The mirror 300, and the actuator 500 which moves the mirror 300 are preferably provided on a silicon wafer.

The size and shape of the electrodes 502 and 510 are preferably designed to ensure that the mirror 300 operates in a stable mode over the desired range of motion, regardless of the voltage applied to the electrode 502. If the electrode 502 is made larger than a critical value, then the mirror can "snap down" to the electrode when the mirror-to-electrode voltage is too large.

The tilted position of the mirror 300 can be set in one of the following three ways. First the position can be determined by mechanical structures 506 on the mirror 300 and/or the electrode chip 508 that limit the amount that the mirror 300 tilts. The second method is to control the voltage that is applied to the drive electrode 502. Whenever the same voltage is applied to the electrode 502, the mirror 300 tilts by the same angle. The third method is to use feedback control. In this case, the angular position of the mirror 300 is measured. The difference between the measured position and desired position is used to control the voltage applied to the drive electrode 502 in such a manner to ensure that the mirror 300 is kept in the desired position. The position of the mirror 300 can be determined by measuring the capacitance between the mirror 300 and the driving electrode 502, or electrodes 504 which are provided for this measuring purpose.

Referring to FIG. 8, the actuator 500 preferably includes trenches 509 to increase the range of possible mirror rotation, to provide a mechanical stop that limits the range of rotation, and to control the squeeze film damping of the mirror 300. The mirror 300 and the torsion spring form a two-pole mechanical system. Two-pole systems will settle fastest if they are critically damped. The size, location, and pattern of trenches in the electrode wafer are designed to ensure that the mirror 300 is close to critical damping so that the optical switch 100 can switch states in the least possible time.

FIGS. 10 and 11 illustrate the structure of a vertical comb drive actuator 600. The vertical comb drive actuator 600 is an alternative actuator that can be used in lieu of or in conjunction with the parallel plate actuator described referring to FIGS. 5–9. The vertical comb driver 600 is fabricated by forming a series of interdigitated fingers 602 on the periphery of the mirror 300 and the adjacent portion of the wafer 400 of FIG. 5. When a voltage is applied between the two sets of fingers 602, the electrostatic force 610 on the mirror 300 will rotate the mirror 300 in the direction that maximizes the capacitance between the fingers 602. If the two sets of fingers 602 are fabricated from the same layer of silicon and are therefore coplanar, the electrostatic force 610 will push the mirror into its as-fabricated coplanar position as shown in FIG. 10. If the fingers 602 are fabricated such that the fingers 602 on the periphery of mirror 300 and the fingers at the adjacent portion of wafer 400 are not coplanar, the electrostatic force 612 will cause the mirror 300 to rotate out of its as-fabricated non-coplanar orientation as shown in FIG. 11. Preferably, the electrostatic forces 610 and 612 are normal to a plane of the silicon wafer 400.

The sensitivity of the position-sensing electrode can be made larger by placing interdigitated electrodes 602 on the edge of the mirror 300 and on the surrounding portion of the wafer 400. These electrodes will form a capacitor whose capacitance will decrease as the mirror 300 rotates out of plane in which the mirror 300 is originally located when the mirror 300 is not actuated.

FIG. 12 illustrates the structure of a levitation force comb actuator 700. The levitation force actuator 700 includes interdigitated fingers 702 on the peripheral portion of the mirror 300, the portion of the wafer 400 adjacent to the mirror 300, and an electrode 705 beneath the both sets of fingers 702. The electrode 705 causes an asymmetry in the electric field between the fingers 702 and the electrode 705 which generates a force 710 normal to and away from the electrode 705.

As described above, instead of moving the reflective surface 300 or 107, the above described functions of the hybrid optical device of this invention may be accomplished by moving the filter 155 and 105 instead. The rotation or movement of the filter may be accomplished by means of mechanisms similar to those described above for moving the reflective surface. The construction of the filter and of the actuator for moving it, the process in making the actuator and the method of control in moving the filter are similar to those described above for the reflective surface so that a detailed description thereof is unnecessary herein.

While the invention has been described above by reference to various embodiments, it will be understood that changes and modifications may be made without departing from the scope of the invention which is to be limited only by the appended claims and their equivalents. For example, while the invention has been illustrated by means of embodiments where the input and output optical channels employ optical fibers, other optical devices or paths may be employed instead and are within the scope of the invention. All references referred to herein are incorporated by reference in their entireties.

What is claimed is:

1. A hybrid optical device comprising:
   a first set of one or more input optical channels that convey one or more beams of radiation;
   a second set of one or more output optical channels which receive radiation from said one or more beams;
   a filter passing at least one first portion of the one or more beams from selected channel(s) of the first set and reflecting at least one second portion of the one or more beams;
   a reflective surface reflecting at least some of the radiation in said at least one first portion; and
   an actuator that rotates said surface about one or more axes transverse to the one or more beams to each of a plurality of positions so that the one or more beams travel from selected channel(s) of said first set to selected channel(s) of said second set, wherein said surface at each of the plurality of positions reflects substantially all of the radiation passed by the filter, and directs a selected corresponding portion of the reflected radiation to the selected channel(s) in the second set.

2. The device of claim 1, wherein said filter reflects a selected portion of each of wavelength components in the radiation in at least one of the beam(s) and passes the remainder of such wavelength components.

3. The device of claim 2, wherein said surface at each of the plurality of positions causes substantially all of the radiation in the remainder of such wavelength components to be reflected to channel(s) in the second set.

4. The device of claim 2, wherein said surface at the plurality of positions causes different intensities of the radiation in the remainder of such wavelength components to be reflected to channel(s) in the second set.

5. The device of claim 1, wherein said filter is a bandpass filter that reflects wavelength components of the radiation in at least one of the beam(s) from the first set having wavelengths outside its passband and passes wavelength components of the radiation in the beam(s) having wavelengths within its passband.

6. The device of claim 5, wherein said surface at each of the plurality of positions causes substantially all of the radiation in the remainder of such wavelength components to be reflected to channel(s) in the second set.

7. The device of claim 5, wherein said surface at the plurality of positions causes different intensities of the radiation in the remainder of such wavelength components to be reflected to channel(s) in the second set.

8. The device of claim 1, wherein a total number of optical channels of said first set and said second set together is more than two.

9. The device of claim 1, wherein a first of the plurality of positions corresponds to a first combination of optical paths through which said beam(s) travels from said first set to said second set, and a second of the plurality of positions corresponds to a second combination of optical paths through which said beam(s) travels from said first set to said second set, wherein said first combination is different from said second combination, so that the device acts as a switch when the actuator moves the surface between the first and second of the plurality of positions.

10. The device of claim 9, wherein said surface at the first and second of the plurality of positions causes substantially all of the radiation in the remainder of such wavelength components to be reflected to channel(s) in the second set.

11. The device of claim 9, wherein said surface at the first and second of the plurality of positions causes different intensities of the radiation in the remainder of such wavelength components to be reflected to channel(s) in the second set so that the device acts as a switch/attenuator.

12. The device of claim 1, further comprising an optical element in an optical path between the first and second sets, said element focusing said one or more beams from the first set and to the second set.

13. The device of claim 1, further comprising:
a ferrule which supports said first set and said second set;
a package encasing said surface and said actuator; and
a transparent window on said package.

14. The device of claim 1, further comprising a gradient index lens between the input and output channels on one hand and the filter and the surface on the other.

15. The device of claim 1, wherein said actuator moves said surface by electrostatic force.

16. The device of claim 1, further comprising a silicon substrate, said surface and said actuator being connected to or forming a part of the silicon substrate.

17. The device of claim 1, said actuator comprising a plurality of interdigitated fingers.

18. The device of claim 1, wherein said filter and surface are such that the input and output channels are bi-directional.

19. The device of claim 1, said first set comprising two input channels and said second set comprising two output channels.

20. A hybrid optical device comprising:
a first set of one or more input optical channels that convey one or more beams of radiation;
a second set of one or more output optical channels which receive radiation from said one or more beams;
a filter passing at least one first portion of the one or more beams from selected channel(s) of the first set and reflecting at least one second portion of the one or more beams;
a reflective surface reflecting at least some of the radiation in said at least one first portion; and
an actuator that rotates said filter about one or more axes transverse to the one or more beams to each of a plurality of positions so that the one or more beams travel from selected channel(s) of said first set to selected channel(s) of said second set, wherein said filter at each of the plurality of positions causes a selected corresponding portion of the radiation to be directed to the selected channel(s) in the second set.

21. A method for optical transmission, comprising:
conveying one or more beams of radiation through a first set of one or more input optical channels;
passing at least one first portion of the one or more beams from the first set and reflecting at least one second portion of the one or more beams by means of a filter;
reflecting at least some of the radiation in said at least one first portion by means of a reflective surface; and
rotating said surface about one or more axes transverse to the one or more beams to each of a plurality of positions so that the radiation reflected by the filter and the surface is directed to selected channel(s) in a second set of one or more output optical channels, wherein said surface at each of the plurality of positions reflect substantially all of the radiation passed by the filter, and directs a selected corresponding portion of the reflected radiation to the selected channel(s) in the second set.

22. A method for optical transmission, comprising:
conveying one or more beams of radiation to a first set of one or more input optical channels;
passing at least one first portion of the one or more beams from the first set and reflecting at least one second portion of the one or more beams by means of a filter;
reflecting at least some of the radiation in said at least one first portion by means of a reflective surface; and
rotating said filter about one or more axes transverse to the one or more beams to each of a plurality of positions so that the radiation reflected by the filter and the surface is directed to selected channel(s) in a second set of one or more output optical channels, wherein said filter at each of the plurality of positions causes a selected corresponding portion of the radiation reflected by the filter to be directed to the selected channel(s) in the second set.

* * * * *